US012688377B2

(12) United States Patent
Chen et al.

(10) Patent No.: US 12,688,377 B2
(45) Date of Patent: Jul. 21, 2026

(54) METHOD AND USER APPARATUS FOR GENERATING AND APPLYING TRANSLATION MARKER

(71) Applicant: KDAN MOBILE SOFTWARE LTD., Tainan (TW)

(72) Inventors: Yu-Wen Chen, Tainan City (TW); Chia-Ting Lee, Tainan City (TW); Wen-Wei Lin, Tainan City (TW); Kai-Lin Shih, Tainan City (TW); Ching-Yi Chiang, Tainan City (TW)

( * ) Notice: Subject to any disclaimer, the term of this patent is extended or adjusted under 35 U.S.C. 154(b) by 349 days.

(21) Appl. No.: 18/215,449

(22) Filed: Jun. 28, 2023

(65) Prior Publication Data

US 2024/0005103 A1 Jan. 4, 2024

Related U.S. Application Data

(60) Provisional application No. 63/356,639, filed on Jun. 29, 2022.

(30) Foreign Application Priority Data

Jan. 3, 2023 (TW) .................................. 112100130

(51) Int. Cl.
G06F 40/51 (2020.01)
G06F 40/169 (2020.01)
(52) U.S. Cl.
CPC ............ G06F 40/51 (2020.01); G06F 40/169 (2020.01)
(58) Field of Classification Search
CPC .... G06F 40/51; G06F 40/169; G06F 3/04842; G06F 40/58
See application file for complete search history.

(56) References Cited

U.S. PATENT DOCUMENTS

| 2008/0189255 A1* | 8/2008 | Zatloukal | ................ | G06F 16/64 |
| | | | | 715/810 |
| 2012/0005571 A1* | 1/2012 | Tang | ........................ | G06F 16/88 |
| | | | | 715/234 |
| 2016/0019205 A1* | 1/2016 | Kidwai | ................... | G06F 40/47 |
| | | | | 704/7 |
| 2018/0357224 A1* | 12/2018 | Yamauchi | ............... | G06F 40/51 |

(Continued)

FOREIGN PATENT DOCUMENTS

| CN | 112633015 A | 4/2021 |
| CN | 112232091 B | 11/2021 |

*Primary Examiner* — Athar N Pasha

(74) *Attorney, Agent, or Firm* — OPES IP Consulting Co., Ltd.

(57) ABSTRACT

This disclosure provides a method and a user apparatus for generating and applying a translation marker, and the method is performed by the user apparatus and comprises: opening an electronic document on a user operation interface; selecting at least one text string in the electronic document according to a first triggering event; and when a translation option is detected to be selected, performing the following steps: generating a code corresponding to the selected text string by using an operation function; and displaying a first translated text string of the first translation record on the user operation interface and generating a first translation marker associated with the first translated text string on the electronic document when it is determined that a first translation record associated with the code exists in the user apparatus.

13 Claims, 17 Drawing Sheets

(56) References Cited

U.S. PATENT DOCUMENTS

| | | | | |
|---|---|---|---|---|
| 2019/0317763 | A1* | 10/2019 | Sakamoto | A63F 13/79 |
| 2021/0042475 | A1* | 2/2021 | Zhang | G06F 40/51 |
| 2021/0342556 | A1* | 11/2021 | Goodman | G06V 30/414 |
| 2022/0391603 | A1* | 12/2022 | Pham | G06F 40/35 |

\* cited by examiner

METHOD AND USER APPARATUS FOR GENERATING AND APPLYING TRANSLATION MARKER

CROSS-REFERENCE TO RELATED APPLICATION

This application claims priority to and the benefit of Taiwan Patent Application Ser. No. 112100130, filed on Jan. 3, 2023, which claims priority to and the benefit of U.S. Provisional Patent Application Ser. No. 63/356,639, entitled "PDF Document Edit Method and Processing Apparatus", filed on Jun. 29, 2022, the entireties of which are incorporated by reference herein.

FIELD

The present disclosure relates generally to a method for performing partial translation on an electronic document, and more particularly to a method and a user apparatus for generating and applying a translation marker on an electronic document.

BACKGROUND

At present, some document editing software or document browsing software provide annotation functions for users to annotate objects such as text, paragraphs, symbols, tables and the like in a document. However, when a user would like to translate a string or a paragraph in a document and annotate a translated string on the string or the paragraph, it is generally necessary to use a translation software, a translation module or a translation website to translate the string or the paragraph and then use a copy and paste function to input the translated string into an annotation field. Therefore, it is time consuming and inconvenient for the user to input the translated string into an annotation field through the way described above.

In order to solve the above-mentioned problem, it is necessary to propose a method by which a translation marker can be generated and applied on an electronic document.

SUMMARY

Accordingly, the present disclosure provides a method for generating and applying a translation marker, and the method is performed by a user apparatus and comprises: opening an electronic document on a user operation interface, wherein the electronic document includes a plurality of text strings; selecting at least one text string from the plurality of text strings according to a first triggering event; displaying a translation option on the user operation interface; detecting whether the translation option is selected; and when the translation option is detected to be selected, performing the following steps: generating a code corresponding to the selected text string by using an operation function; determining whether a first translation record associated with the code exists in the user apparatus, wherein the first translation record includes a first translated text string corresponding to the selected text string; and displaying the first translated text string on the user operation interface and generating a first translation marker associated with the first translated text string on the electronic document when it is determined that the first translation record exists in the user apparatus.

In an embodiment of the present disclosure, when the translation option is detected to be selected, the method further comprises performing the following steps: sending a translation request to a server to request the server to return a second translated text string corresponding to the selected text string when it is determined that the first translation record does not exist in the user apparatus, wherein the translation request carries the code and the selected text string; receiving the second translated text string from the server in response to the translation request; and displaying the second translated text string on the user operation interface and generating a second translation marker associated with the second translated text string on the electronic document when the second translated text string is received from the server.

In an embodiment of the present disclosure, the second translated text string is read from a database of the server.

In another embodiment of the present disclosure, the second translated text string is generated by the server calling a translation module to translate the selected text string and transmitted to the user apparatus by the server.

In an embodiment of the present disclosure, the method further comprises: storing the code and the second translated text string as a second translation record and storing the second translation record in the user apparatus.

In an embodiment of the present disclosure, the method further comprises: encoding the translation request into a JSON (JavaScript Object Notation) object and sending the JSON object to the server.

In an embodiment of the present disclosure, the operation function is a Hash function, and the code is a hash value.

In an embodiment of the present disclosure, the step of generating the first translation marker associated with the first translated text string on the electronic document further comprises: generating the first translation marker associated with the first translated text string on the electronic document according to a second triggering event.

In an embodiment of the present disclosure, the method further comprises: displaying the first translated text string on the user operation interface when the first translation marker is selected.

In an embodiment of the present disclosure, the method further comprises: generating an annotation marker on the electronic document according to a third triggering event and displaying the first translation marker and the annotation marker on the electronic document at the same time, wherein the annotation marker is associated with an annotation text string.

The present disclosure further provides a user apparatus for generating and applying a translation marker, and the user apparatus comprises a processor, a display and a storage. The display is electrically coupled to the processor and is configured to display a user operation interface. The storage is electrically coupled to the processor and stores at least one computer executable program, wherein the at least one computer executable program, when executed by the processor, causes the processor to perform the following steps: opening an electronic document on the user operation interface, wherein the electronic document includes a plurality of text strings; selecting at least one text string from the plurality of text strings according to a first triggering event; displaying a translation option on the user operation interface; detecting whether the translation option is selected; and when the translation option is detected to be selected, further performing the following steps: generating a code corresponding to the selected text string by using an operation function; determining whether a first translation record associated with the code exists in the storage, wherein the first translation record includes a first translated text string corresponding to the selected text string; and displaying the first translated text string on the user operation interface and generating a first translation marker associated with the first translated text string on the electronic document when it is determined that the first translation record exists in the storage.

In an embodiment of the present disclosure, the user apparatus further comprises an input device, wherein the input device is configured to receive a first input and generate a first input signal corresponding to the first input, wherein the first triggering event is generated according to the first input signal.

In an embodiment of the present disclosure, the user apparatus further comprises a transmitter and a receiver. The transmitter is electrically coupled to the processor and configured to send a translation request to a server to request the server to return a second translated text string corresponding to the selected text string when the processor determines that the first translation record does not exist in the storage, wherein the translation request carries the code and the selected text string. The receiver is electrically coupled to the processor and configured to receive the second translated text string, which is in response to the translation request, from the server.

In an embodiment of the present disclosure, when the receiver receives the second translated text string from the server, the processor is further configured to display the second translated text string on the user operation interface and generate a second translation marker associated with the second translated text string on the electronic document.

In an embodiment of the present disclosure, the process further performs: storing the code and the second translated text string as a second translation record and storing the second translation record in the storage.

In an embodiment of the present disclosure, the processor further performs: encoding the translation request into a JSON (JavaScript Object Notation) object and sending the JSON object to the server through the transmitter.

In an embodiment of the present disclosure, the processor further performs: displaying the first translated text string on the user operation interface when the first translation marker is selected.

In an embodiment of the present disclosure, the processor further performs: generating an annotation marker on the electronic document according to a third triggering event and displaying the first translation marker and the annotation marker on the electronic document at the same time, wherein the annotation marker is associated with an annotation text string.

BRIEF DESCRIPTION OF THE DRAWINGS

In order to make the above and other objects, features, advantages and embodiments of the present disclosure more readily understood, the accompanying drawings are described as follows.

DETAILED DESCRIPTION OF THE PREFERRED EMBODIMENTS

In the present disclosure, "a", "an" and "the" may refer to a singular form or a plural form, unless an article is specifically restricted to be a singular form in the context.

In addition, as used herein, the terms "comprise/comprising", "include/including", "have/having" and the like are open-ended terms that imply the inclusion of the disclosed features, elements and/or components, but does not preclude the presence or addition of one or more other features, elements, components, and/or groups thereof.

Furthermore, as used herein, the term "coupled" may indicate that two or more elements or devices are in direct physical contact with each other or in indirect physical contact with each other, and may also indicate that two or more elements or devices cooperate or interact with each other.

The spirit of the present disclosure will be clearly illustrated with drawings and detailed descriptions below. After understanding the embodiments of the present disclosure, those skilled in the art with ordinary knowledge can make modifications and variations based on the technologies taught in the present disclosure without departing from the spirit and scope of the present disclosure.

Figure 1:
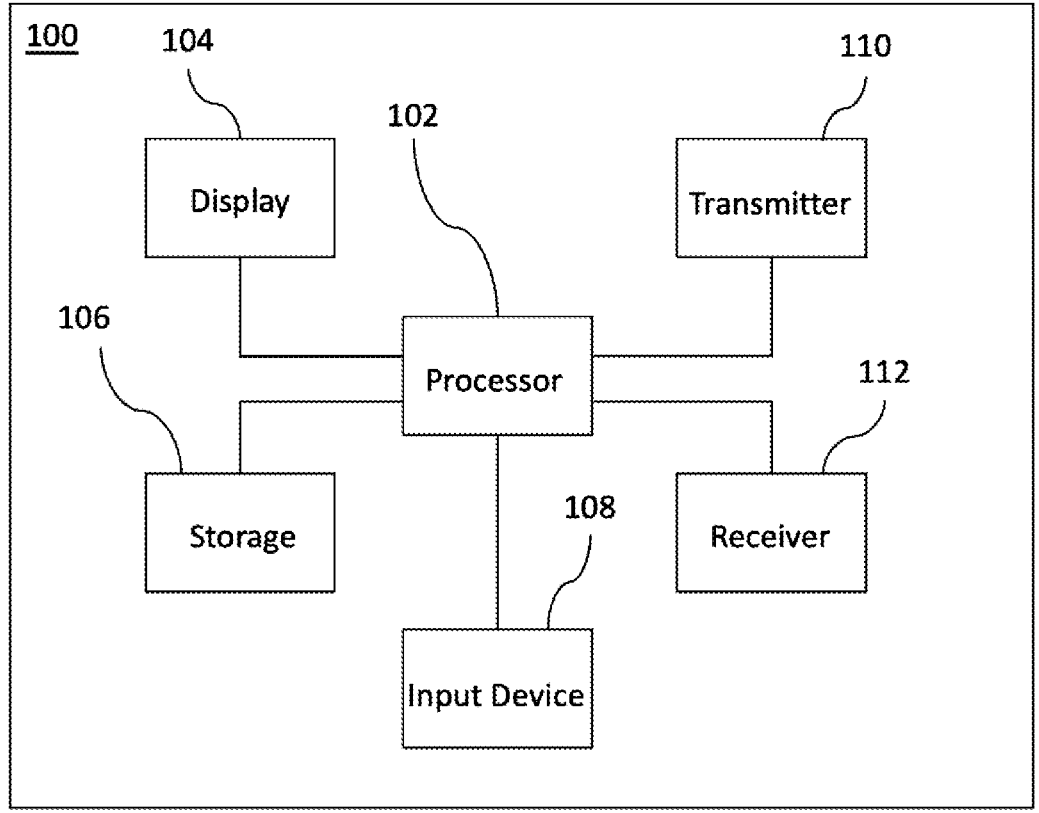
FIG. 1 is a block diagram of a user apparatus for generating and applying a translation marker according to an embodiment of the present disclosure.

FIG. 1 is a block diagram of a user apparatus 100 for generating and applying a translation marker according to an embodiment of the present disclosure. The user apparatus 100 includes a processor 102, a display 104, a storage 106, an input device 108, a transmitter 110, and a receiver 112. The display 104, the storage 106, the input device 108, the transmitter 110, and the receiver 112 are each electrically coupled to the processor 102.

Figure 2A:
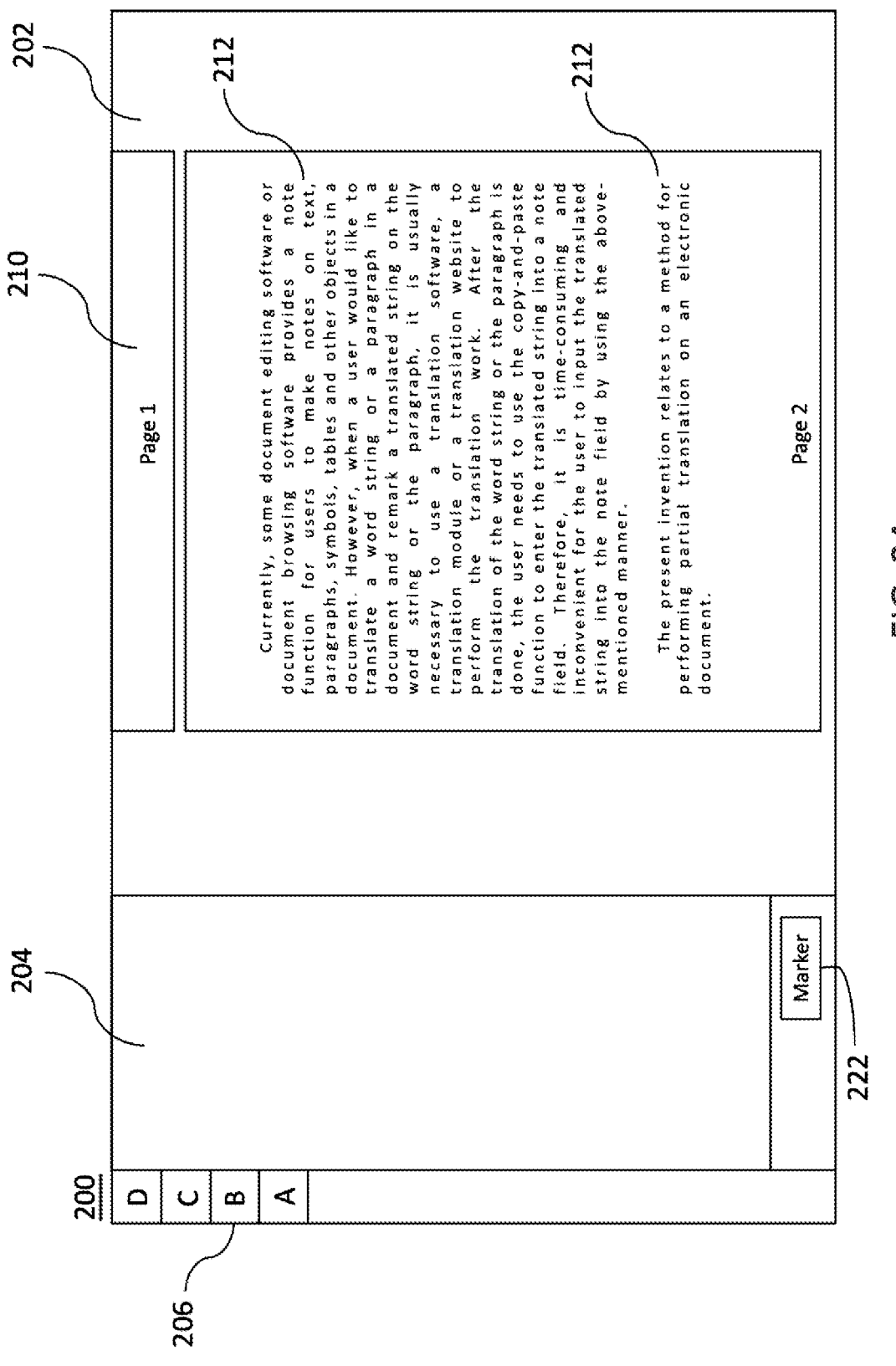
FIG. 2A to FIG. 2H are schematic diagrams of a user operation interface in different operation states according to an embodiment of the present disclosure.

FIG. 2A to FIG. 2H are schematic diagrams of a user operation interface 200 in different operation states according to an embodiment of the present disclosure. Referring now to FIG. 1 and FIG. 2A, the display 104 is configured to display the user operation interface 200. In the present embodiment, the user operation interface 200 may be a user operation interface generated by a document editing software or a document browsing software executed by the processor 102. The user operation interface 200 includes a document display area 202, an auxiliary display area 204, and a function selection area 206.

Figure 2B:
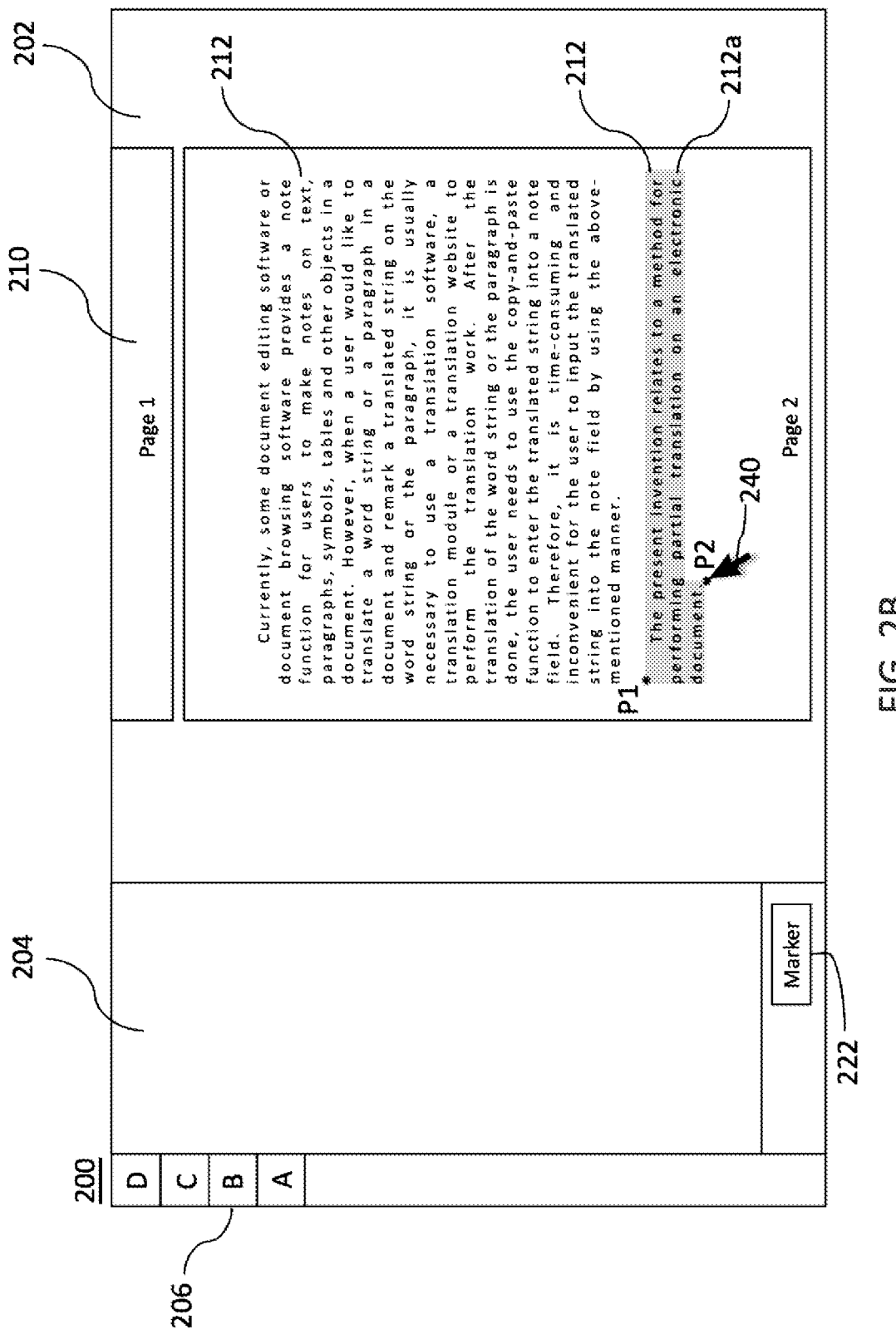
Figure 2C:
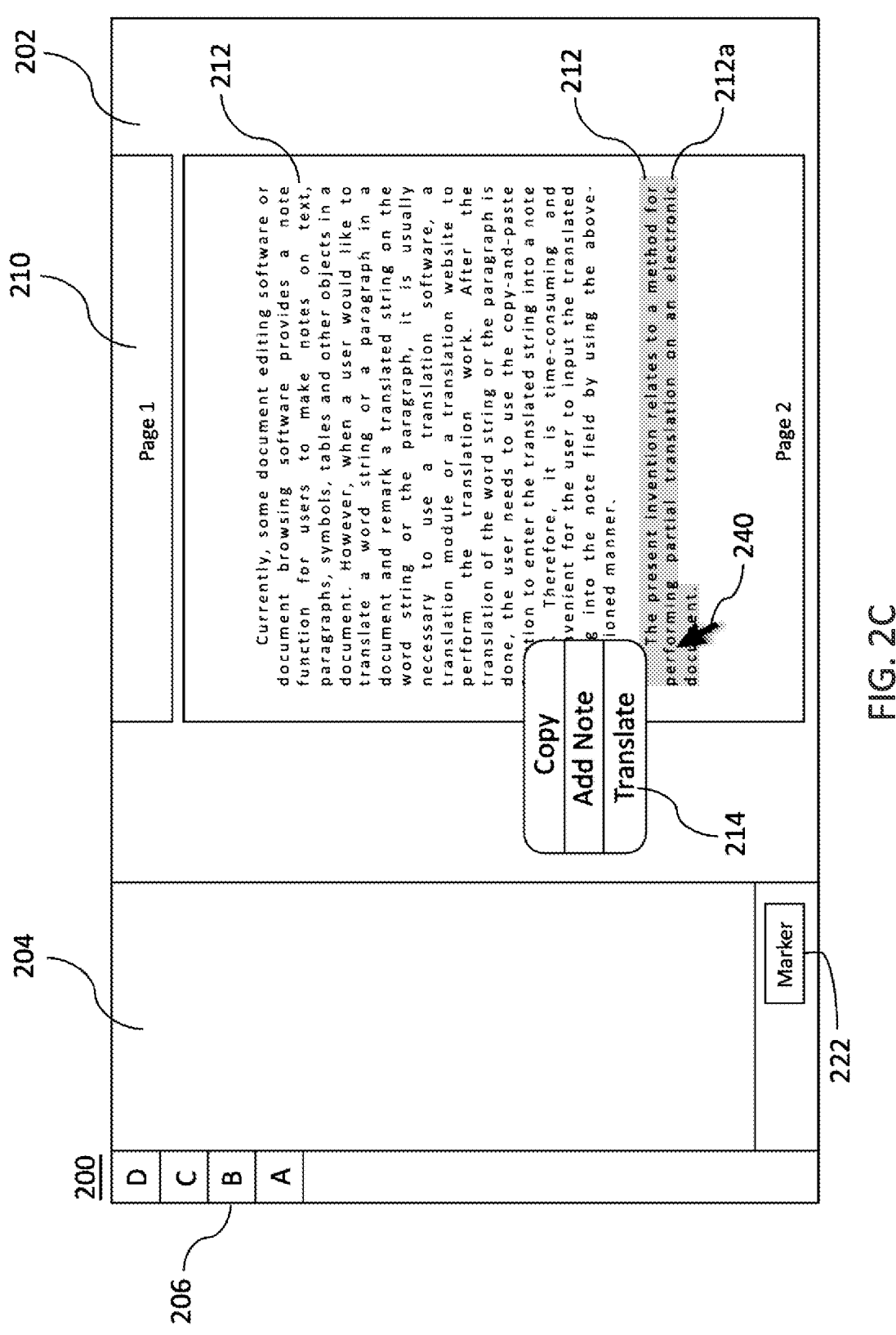
Figure 2D:
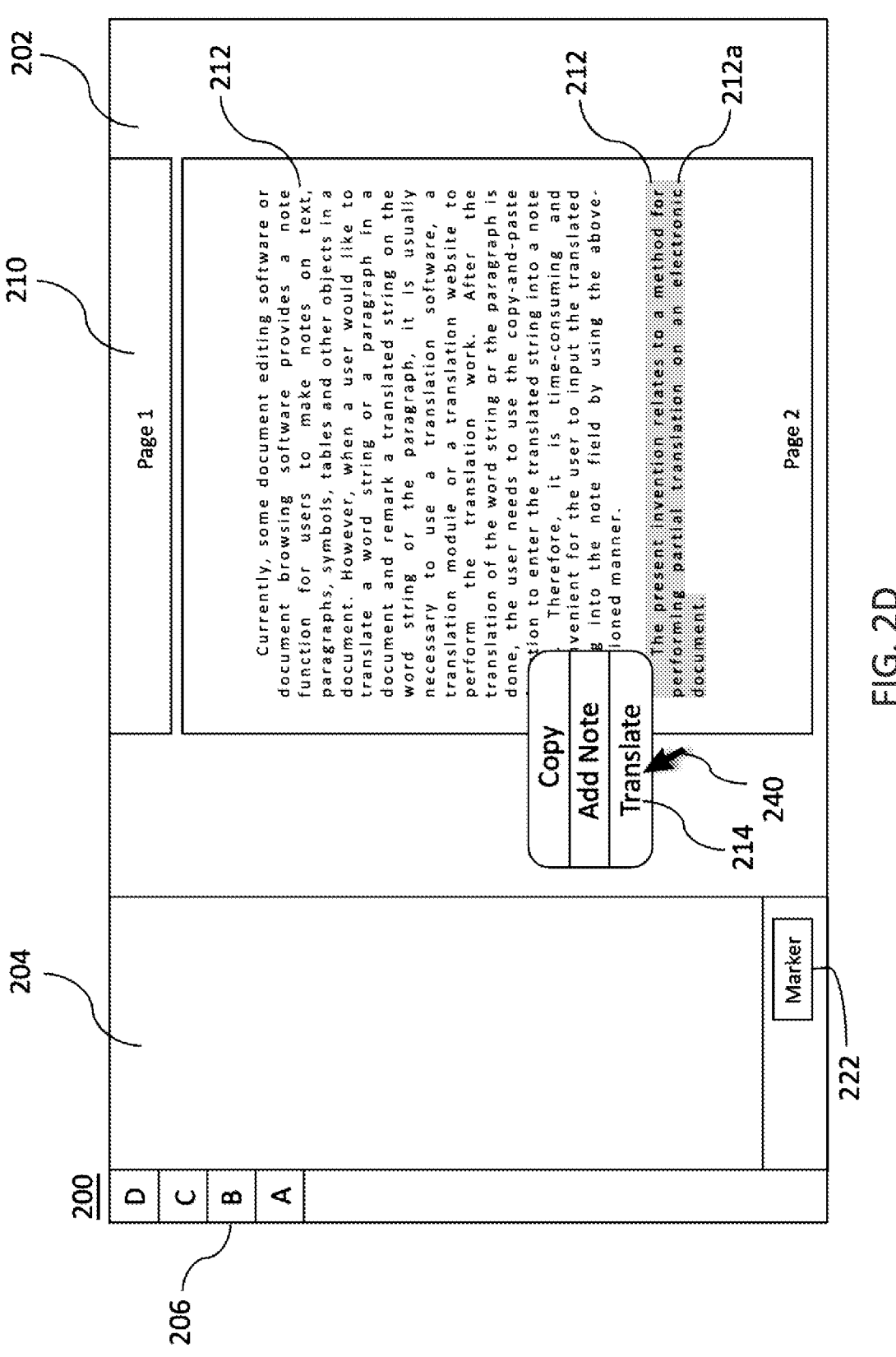
Figure 2E:
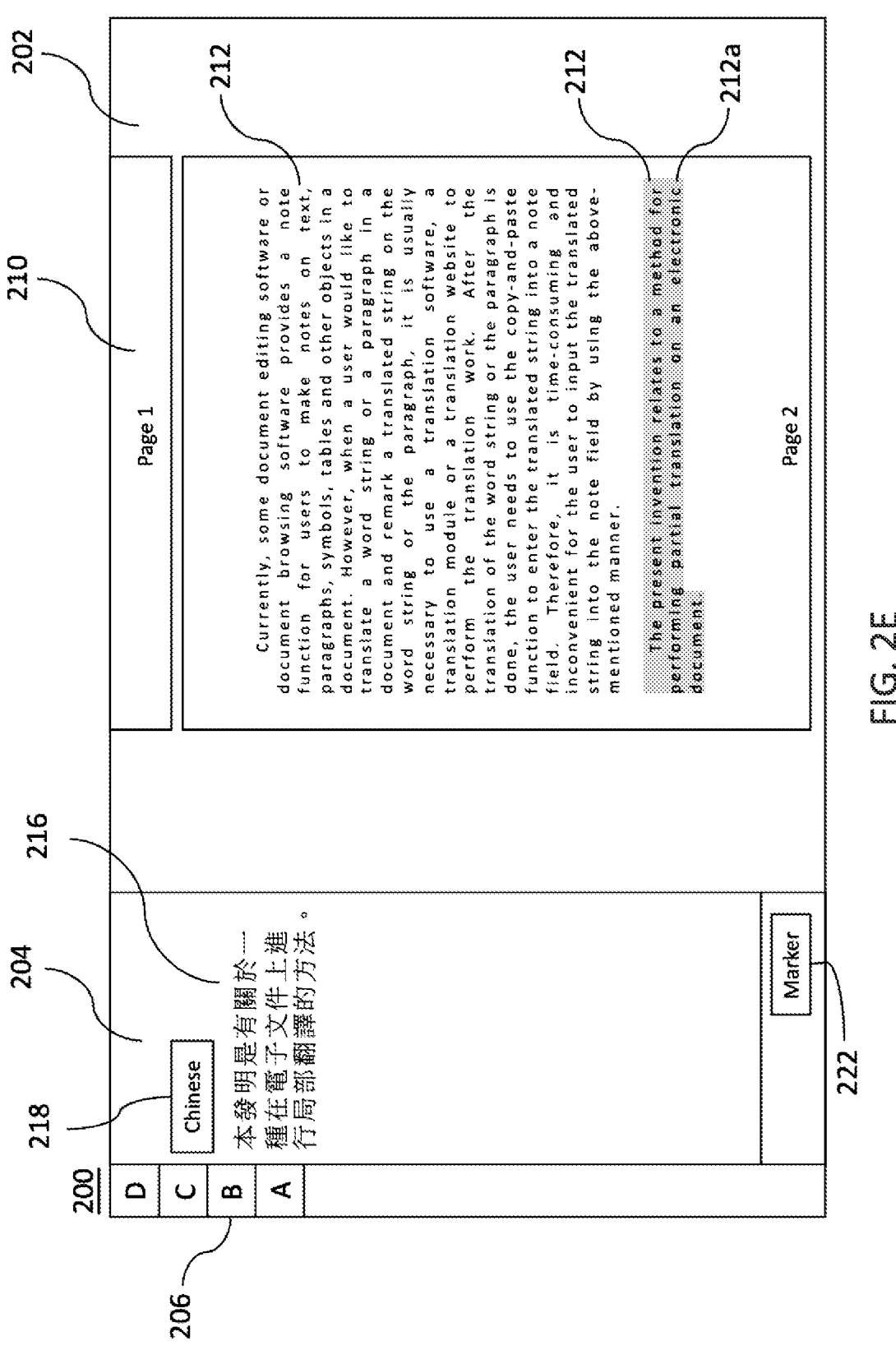
Figure 2F:
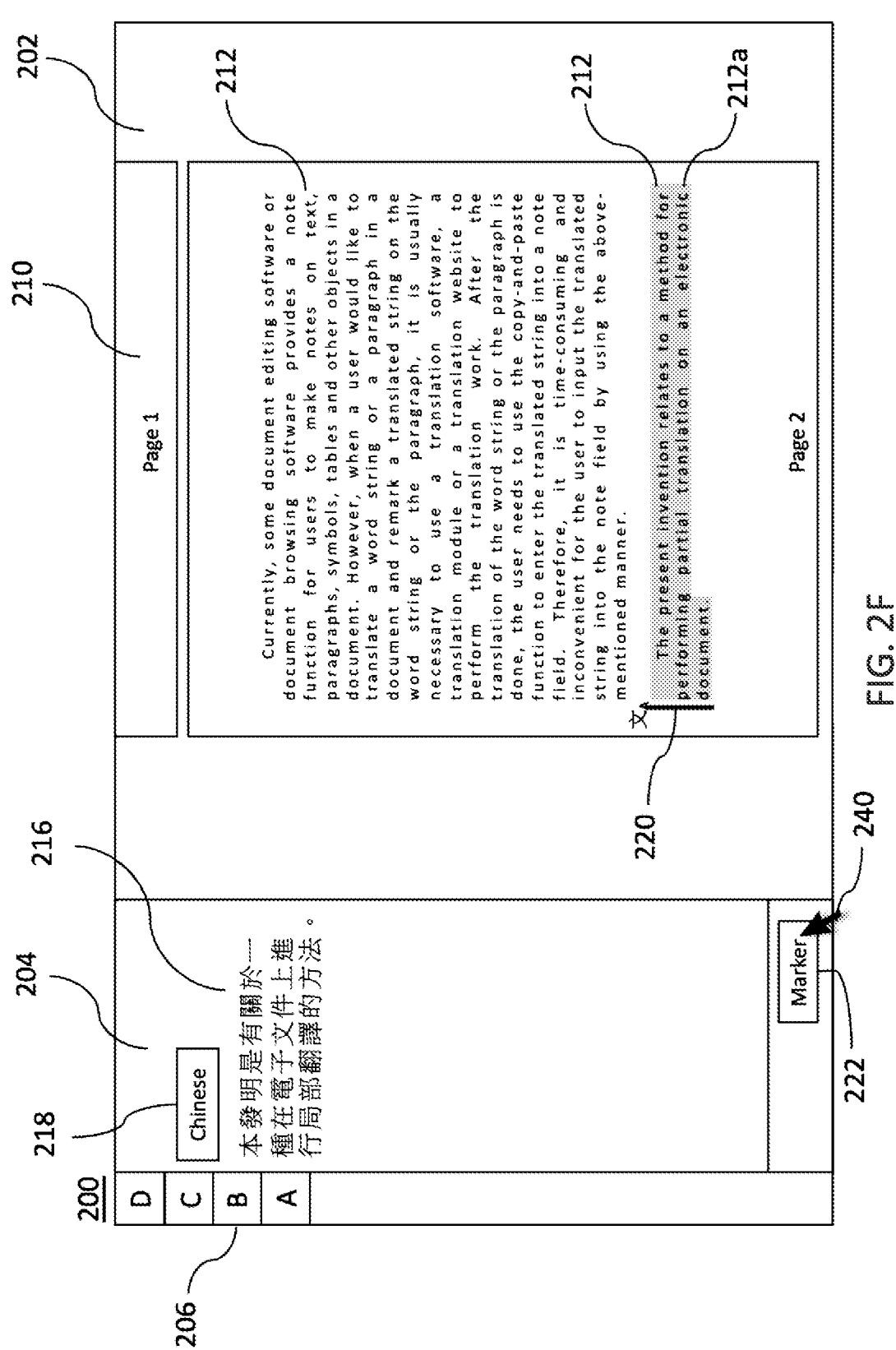
Figure 3A:
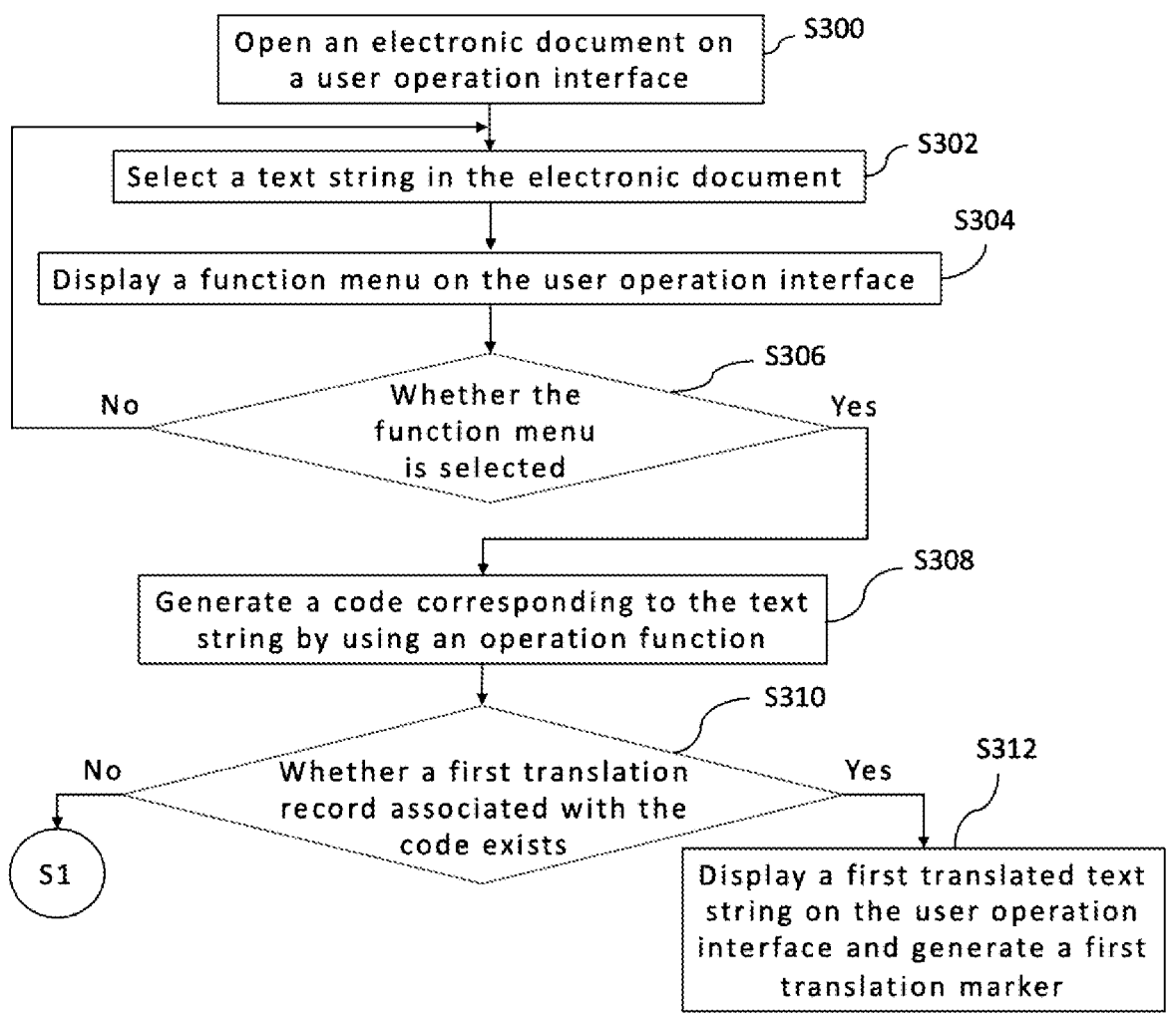
FIG. 3A and FIG. 3B are flowcharts illustrating a method for generating and applying a translation marker according to an embodiment of the present disclosure.
Figure 3B:
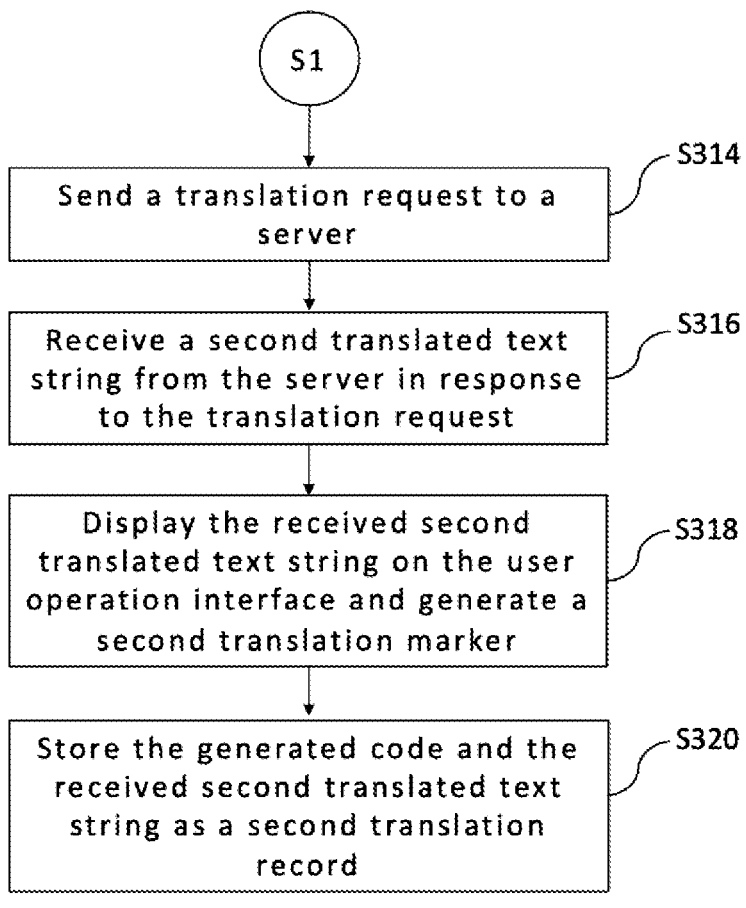

FIG. 3A and FIG. 3B are flowcharts illustrating a method for generating and applying a translation marker according to an embodiment of the present disclosure. In the present embodiment, the method is performed by the user apparatus 100. Referring now to FIG. 1, FIGS. 2A-2F, and FIG. 3A, the storage 106 stores at least one computer executable program that, when executed by the processor 102, causes the processor 102 to perform the method of generating and applying a translation marker disclosed in the embodiment of FIG. 3A and FIG. 3B. The method comprises the following steps S300 to S320 and is described below.

In step S300, the processor 102 executes a document editing software or a document browsing software to open an electronic document 210 on the document display area 202 of the user operation interface 200 according to a user operation. In the present embodiment, the electronic document 210 at least includes a plurality of paragraphs 212, each paragraph 212 has at least one text string, and the language category of the plurality of paragraphs 212 is English as shown in FIG. 2A.

In step S302, the processor 102 can select at least one text string 212a of the plurality of text strings according to a first triggering event. In the present embodiment, the selected text string 212a may be highlighted to indicate that it has been selected as shown in FIG. 2B. In addition, in the present embodiment, the first triggering event may be a moving selection of a cursor (for example, a movement from point P1 to point P2) controlled by the input device 108 (e.g., a mouse, a touch panel or a keyboard) on the text string 212a, but may not be limited thereto.

In step S304, the processor 102 can drive the display 104 to display a function menu 214 on the user operation interface 200. In the present embodiment, the processor 102 can drive the display 104 to display the function menu 214 on the user operation interface 200 according to a first input signal generated by the input device 108 as shown in FIG. 2C. For example, the first input signal may be generated by hovering a cursor 240 over the selected text string 212a and performing a right click of a mouse or a short touch of a touch panel, but may not be limited thereto. In the present embodiment, the function menu 214 includes, but is not limited to, a "Translate" option, an "Add Note" option, a "Copy" option and the like. In another embodiment, the function menu 214 may include only a "Translate" option. In other embodiments, the "Translate" option of the function menu 214 may be a function option on the function selection area 206. That is, the "Translate" option of the function menu 214 may be automatically displayed on the function selection area 206 of the user operation interface 200 after the processor 102 executes a document editing software or a document browsing software. For example, the function selection area 206 includes four function options A, B, C, D, and the function option A can be a "Translate" option of the function menu 214.

In step S306, the processor 102 can detect whether the "Translate" option of the function menu 214 is selected. When the processor 102 detects that the "Translate" option of the function menu 214 is selected, the processor 102 will perform steps S308 to S318; otherwise, the processor 102 will return to step S302 to reselect another text string on the electronic document 210. In the present embodiment, the processor 102 can determine whether the "Translate" option of the function menu 214 is selected according to a second input signal of the input device 108. For example, the second input signal may be generated by moving a cursor 240 to the "Translate" option of the function menu 214 (as shown in FIG. 2D) and performing a left click of a mouse or a short touch of a touch panel, but may not be limited thereto. Specifically, when the processor 102 detects or receives the second input signal, it is indicated that the processor 102 has detected that the "Translate" option of the function menu 214 is selected.

In step S308, the processor 102 can generate a code corresponding to the selected text string 212a by using an operation function. In the present embodiment, the operation function is a Hash function, and the code is a hash value generated by the Hash function for the selected text string 212a. The hash value is a short code for representing the selected text string 212a. The length of the hash value is shorter than the length of the selected text string 212a.

Therefore, when the hash value is stored in the storage 106, the storage space occupied by the hash value is relatively smaller than the storage space occupied by the selected text string 212a.

In step S310, the processor 102 can determine whether a first translation record associated with the code exists in the storage 106 of the user apparatus 100. In the present embodiment, the first translation record may include a first translated text string corresponding to the selected text string 212a. For example, the processor 102 can use the generated hash value to determine whether the first translation record exists in the storage 106. In another embodiment, the first translation record may at least include a target language type (e.g., Chinese, Japanese or any of other languages), an indexed hash value and the first translated text string, wherein the target language type is used to indicate the language type of the first translated text string. When the processor 102 uses the generated hash value to determine whether the first translation record exists in the storage 106, the processor 102 can compare the generated hash value with the indexed hash value. When a comparing result shows that the generated hash value is identical or associated with the indexed hash value, the processor 102 can determine that a first translation record associated with the generated hash value exists in the storage 106.

In step S312, when the processor 102 determines that the first translation record exists in the storage 106 of the user apparatus 100, the processor 102 can read the first translated text string from the first translation record and drive the display 104 to display the read first translated text string 216 and/or its language type 218 (e.g., Chinese) on the auxiliary display area 204 of the user operation interface 200 (as shown in FIG. 2E), and generate a first translation marker 220 associated with the read first translation text string 216 on the electronic document 210 according to a second triggering event (as shown in FIG. 2F). In the present embodiment, the second triggering event may be a clicking selection of a cursor 240 controlled by the input element 108 (such as a mouse, a touch panel or a keyboard) on a software button 222, but may not be limited thereto. In another embodiment, when the processor 102 determines that the first translation record exists in the storage 106 of the user apparatus 100, the processor 102 can drive the display 104 to display the read first translated text string 216 and/or its language type 218 (e.g., Chinese) on the auxiliary display area 204 of the user operation interface 200 and automatically generate a first translation marker 220 associated with the read first translated text string 216 on the electronic document 210 (that is, without according to the second triggering event).

Figure 4:
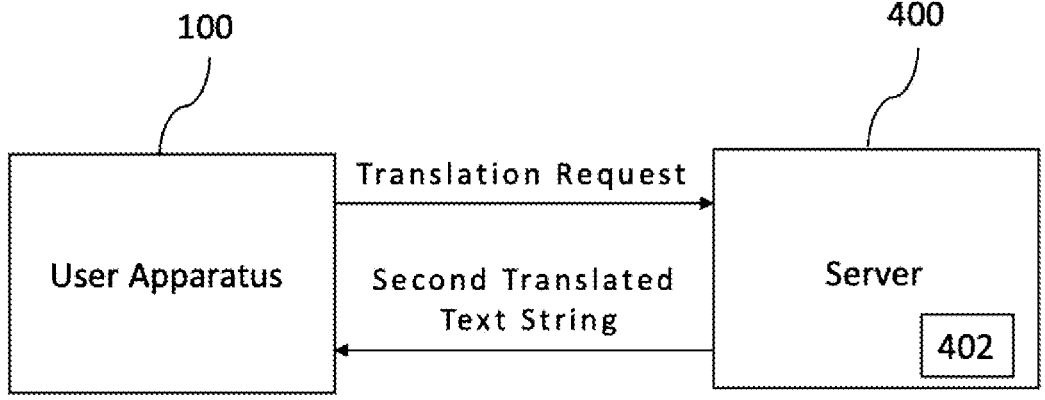
FIG. 4 is a schematic diagram illustrating the operation of the user apparatus of FIG. 1 requesting a server to return a translated text string.

FIG. 4 is a schematic diagram illustrating the operation of the user apparatus 100 of FIG. 1 requesting a server 400 to return a translated text string. Referring now to FIG. 1, FIG. 2G, FIG. 3B and FIG. 4, steps S314 to S320 will be described below.

In step S314, when the processor 102 determines that the first translation record does not exist in the storage 106 of the user apparatus 100, the processor 102 can send a translation request to the server 400 through the transmitter 110 to request the server 400 to return a second translated text string corresponding to the selected text string 212a. In the present embodiment, the translation request carries the generated hash value, the selected text string 212a, and a target language type (e.g., Chinese, Japanese or any of other languages), but may not be limited thereto. For example, when the document editing software or document browsing software executed by the processor 102 only provides a translation function between two languages (e.g., English and Chinese), the translation request may only carry the generated hash value and the selected text string 212a. Further, in the present embodiment, the processor 102 can encode the translation request into a first JSON (JavaScript Object Notation) object and send the first JSON object to the server through the transmitter 110. In another embodiment, the processor 102 can send the translation request directly to the server 400 without encoding the translation request into the first JSON object.

In the present embodiment, after receiving the first JSON object, the server 400 can decode the first JSON object to obtain the translation request. Then, the server 400 can use the hash value carried by the translation request to determine whether a second translation record associated with the carried hash value exists in a storage 402 of the server 400. In the present embodiment, the second translation record may include a second translated text string corresponding to the selected text string 212a. For example, the server 400 can use the carried hash value to determine whether the second translation record exists in a storage 402 of the server 400. In another embodiment, the second translation record may at least include a target language type (e.g., Chinese, Japanese or any of other languages), an indexed hash value and the second translated text string, wherein the target language type is used to indicate the language type of the second translated text string. When the server 400 uses the carried hash value to determine whether the second translation record exists in the storage 402, the server 400 can compare the carried hash value with the indexed hash value. When a comparing result shows that the carried hash value is identical or associated with the indexed hash value, the server 400 can determine that a second translation record associated with the carried hash value exists in the storage 402 and read the second translated text string from the second translation record stored in the storage 402. Then, the server 400 can send the read second translated text string to the user apparatus 100. In the present embodiment, the server 400 can encode the second translated text string into a second JSON object and send the second JSON object to the user apparatus 100. In another embodiment, the server 400 can send the second translated text string directly to the user apparatus 100 without encoding the second translated text string into the second JSON object.

In the present embodiment, when a comparing result does not show that the carried hash value is identical or associated with the indexed hash value, the server 400 can determine that a second translation record associated with the carried hash value does not exist in the storage 402 and call a translation module to translate the selected text string 212a so as to generate the second translated text string. In the present embodiment, the translation module may be a translation software stored in the storage 402 and executed by the server 400 or a translation software executed on a remote translation server (not shown). Then, the server 400 can store the hash value and the generated second translated text string as the second translation record and store the second translation record in the storage 402. Finally, the server 400 can encode the generated second translated text string into the second JSON object and send the second JSON object to the user apparatus 100. In another embodiment, the server 400 can send the second translated text string directly to the user apparatus 100 without encoding the generated second translated text string into the second JSON object.

In step S316, the processor 102 can receive through the receiver 112 a second translated text string from the server 400 in response to the translation request. For example, the processor 102 can receive through the receiver 112 the second JSON object from the server 400 and decode the second JSON object to obtain the second translated text string. In another embodiment, the processor 102 can receive through the receiver 112 the second translated text string that is not encoded into a JSON object.

Figure 2G:
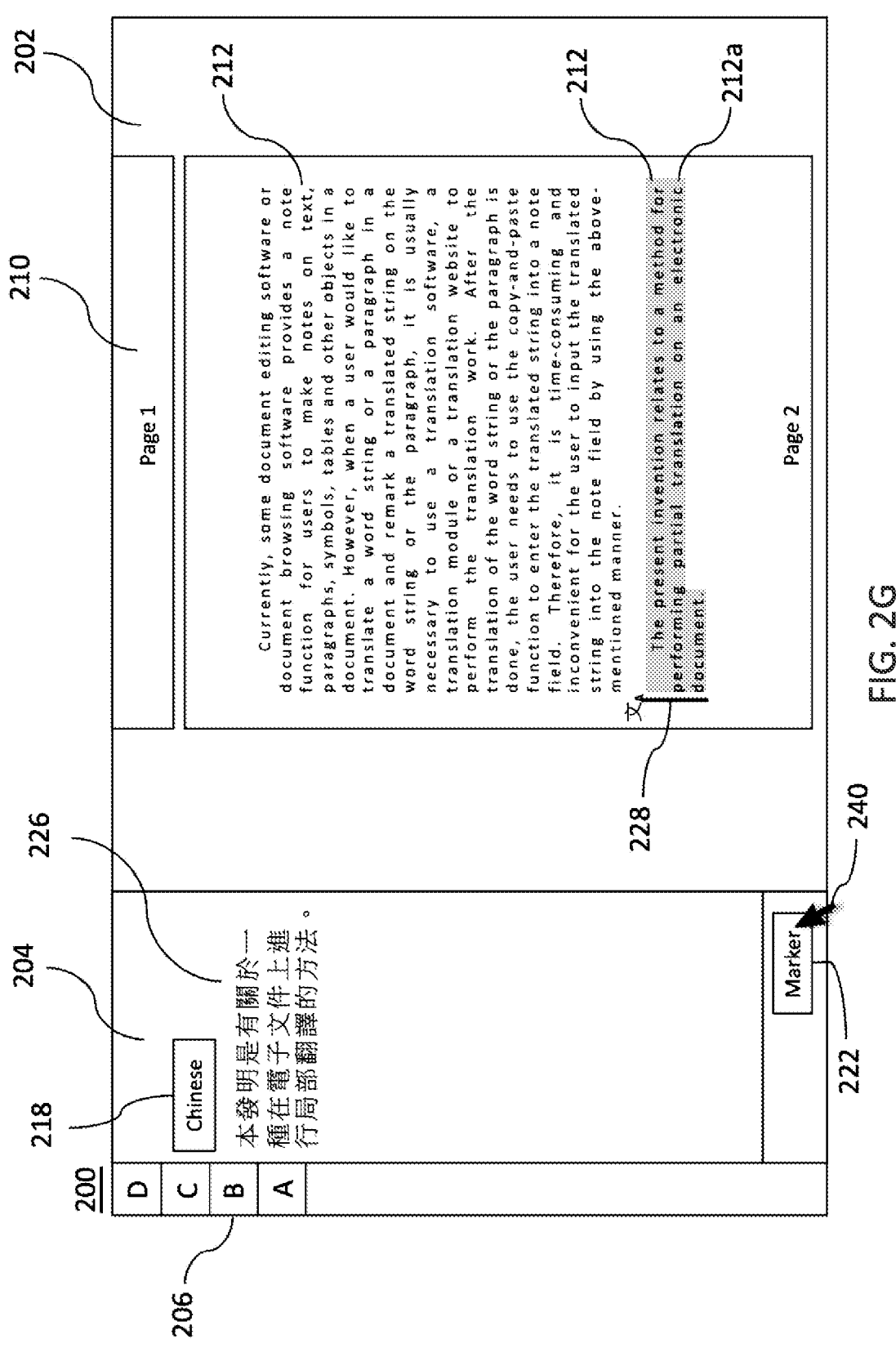

In step S318, when the processor 102 receives through the receiver 112 the second translated text string from the server 400, the processor 102 can drive the display 104 to display the received second translated text string 226 on the user operation interface 200 and generate a second translation marker 228 associated with the second translated text string 226 on the electronic document 210 according to the second triggering event, as shown in FIG. 2G. In the present embodiment, the received second translated text string 226 and the read first translated text string 216 may be the same. However, in other embodiments, when the received second translated text string 226 and the read first translated text string 216 are generated by different translation modules or different translation software, both may be slightly different. In another embodiment, when the processor 102 receives through the receiver 112 the second translated text string from the server 400, the processor 102 can drive the display 104 to display the received second translated text string 226 on the user operation interface 200 and automatically generate a second translation marker 228 associated with the second translated text string 226 on the electronic document 210 (that is, without according to the second triggering event).

In step S320, the processor 102 can store the generated code (e.g., the generated hash value) and the received second translated text string 226 as a second translation record and store the second translation record in the storage 106 of the user apparatus 100.

Figure 2H:
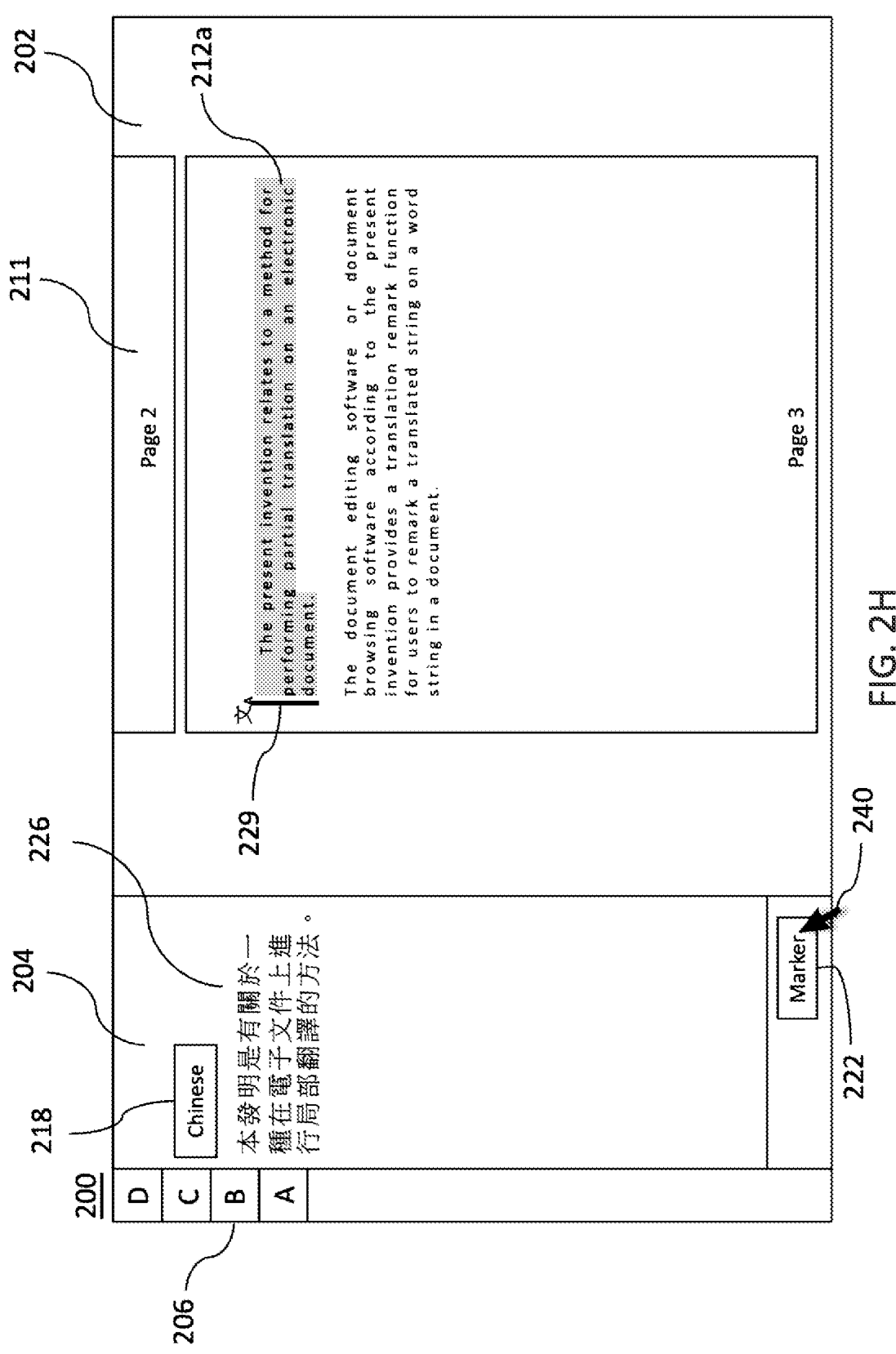

Referring now to FIG. 2H, when the processor 102 opens another electronic document 211 containing the text string 212a according to another user operation, the processor 102 can perform steps S302 to S312 to determine that the second translation record stored in the above-mentioned step S320 exists in the storage 106, and then display the second translated text string 226 of the second translation record on the auxiliary display area 204 of the user operation interface 200 and generate a third translation marker 229 corresponding to the text string 212a.

Figure 5A:
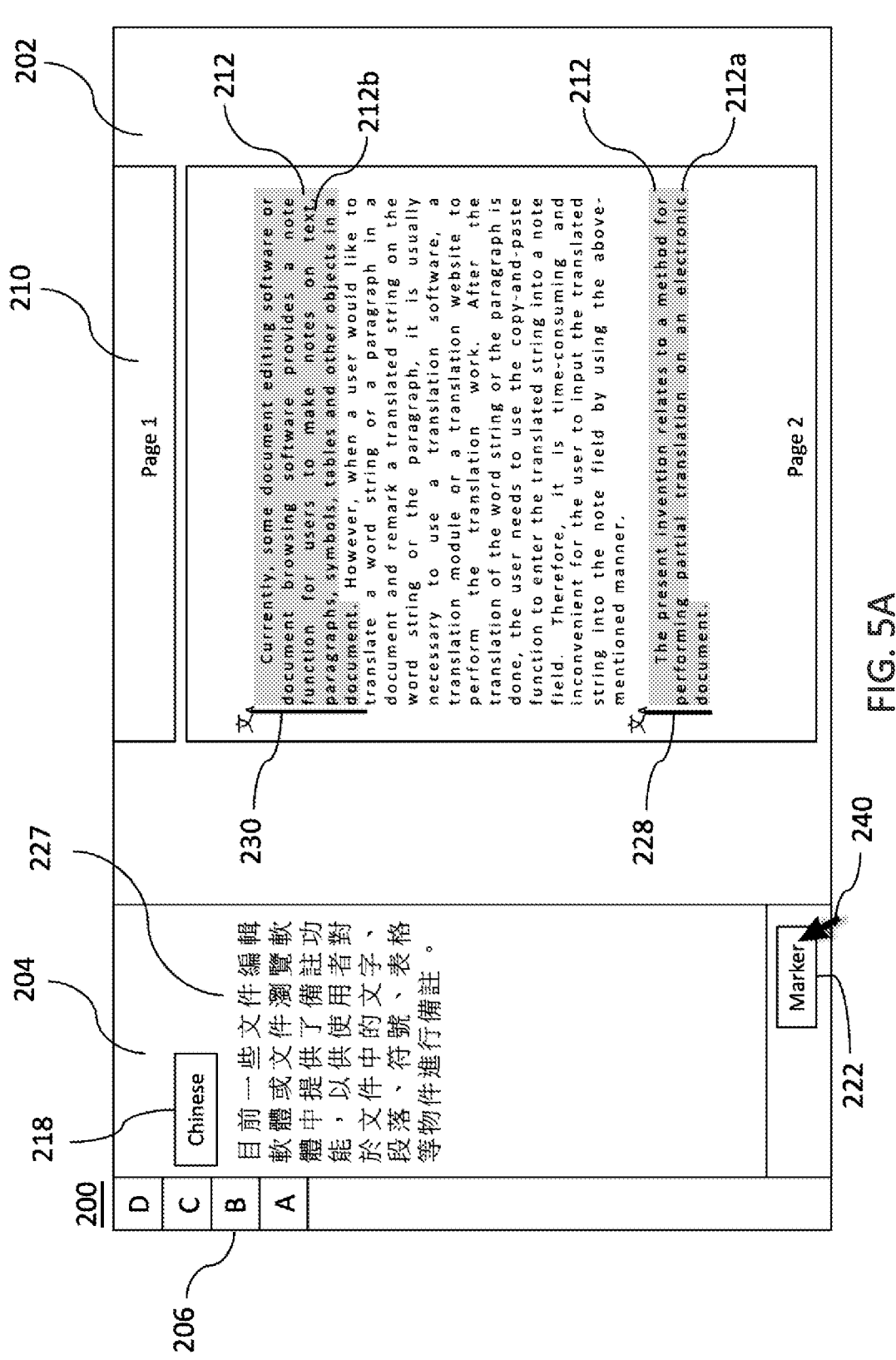
FIG. 5A and FIG. 5B are schematic diagrams of a user operation interface in different operation states according to another embodiment of the present disclosure.
Figure 5B:
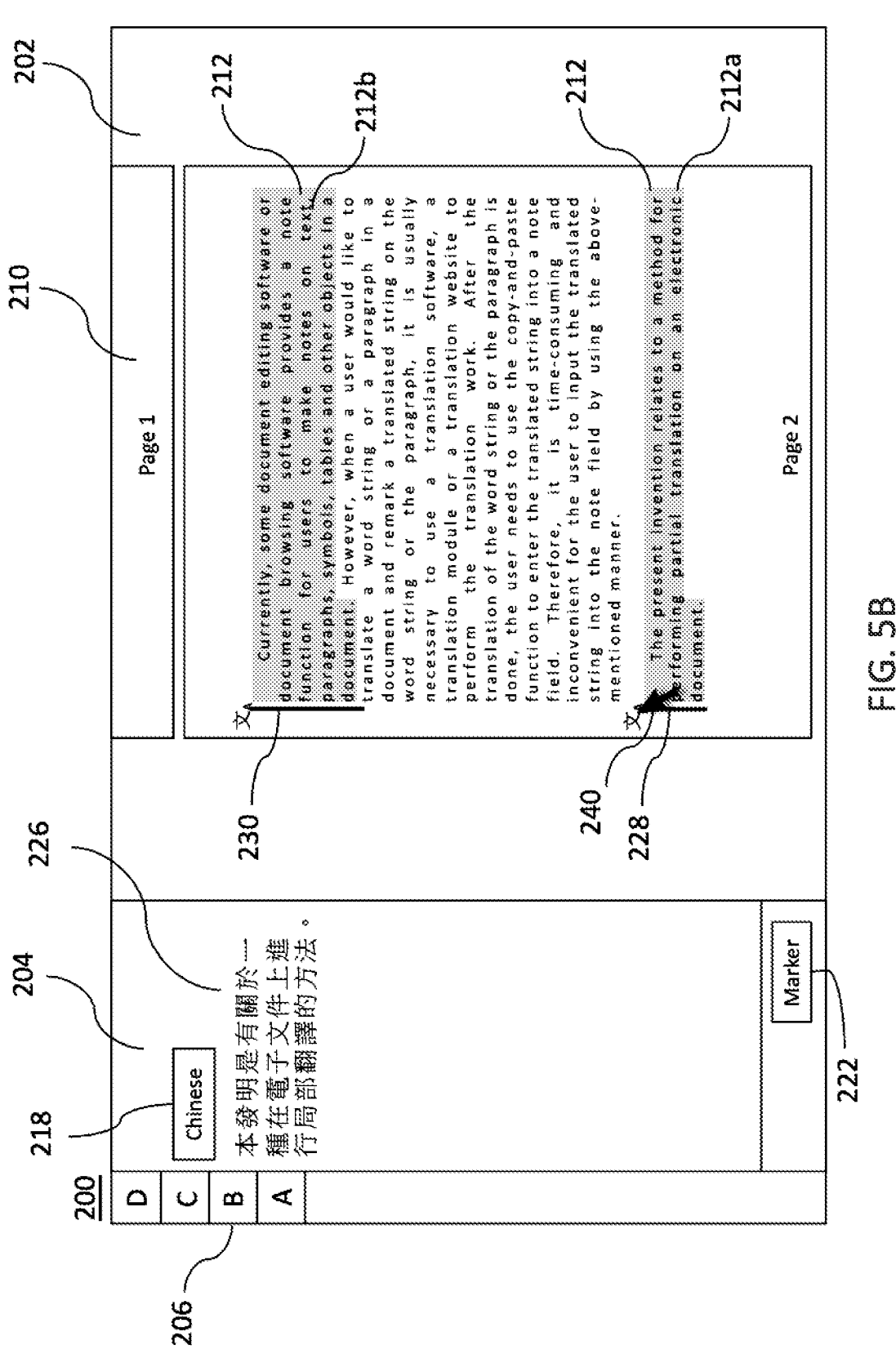

FIG. 5A and FIG. 5B are schematic diagrams of a user operation interface in different operation states according to another embodiment of the present disclosure. Referring now to FIG. 5A, the processor 102 can perform steps S302 to S318 of the above embodiment to select a text string 212b, and then display a third translated text string 227 corresponding to the selected text string 212b on the auxiliary display area 204 of the user operation interface 200 and generate a fourth translation marker 230 corresponding to the selected text string 212b.

In the above embodiment, the method according to the present disclosure may further comprise the following step. When the first translation marker 220, the second translation marker 228, the third translation marker 229 or the fourth translation marker 230 is selected, the processor 102 can display the first translated text string 216, the second translated text string 226 or the third translated text string 227 corresponding thereto on the auxiliary display area 204 of the user operation interface 200. For example, in FIG. 5A, the third translated text string 227 corresponding to the text string 212b is displayed on the auxiliary display area 204, and the processor 102 can detect whether the cursor 240 controlled by the input device 108 moves to the second translation marker 228 for performing selection. For example, the selection may be performed by a left click on a mouse or a touch on a touch panel. When the processor 102 detects that the cursor 240 controlled by the input device 108 moves to the second translation marker 228 for performing selection, the processor 102 can drive the display 104 to display the second translated text string 226 corresponding to the text string 212a on the auxiliary display area 204 of the user operation interface 200 so as to replace the third translated text string 227, as shown in FIG. 5B.

In other embodiment, the processor 102 may generate at least one translation marker and at least one annotation marker on the same electronic document, such that the method according to the present disclosure can support a function of generating a translation marker and an annotation marker on the same electronic document at the same time. This function will be described below with reference to FIG. 6A to FIG. 6C.

Figure 6A:
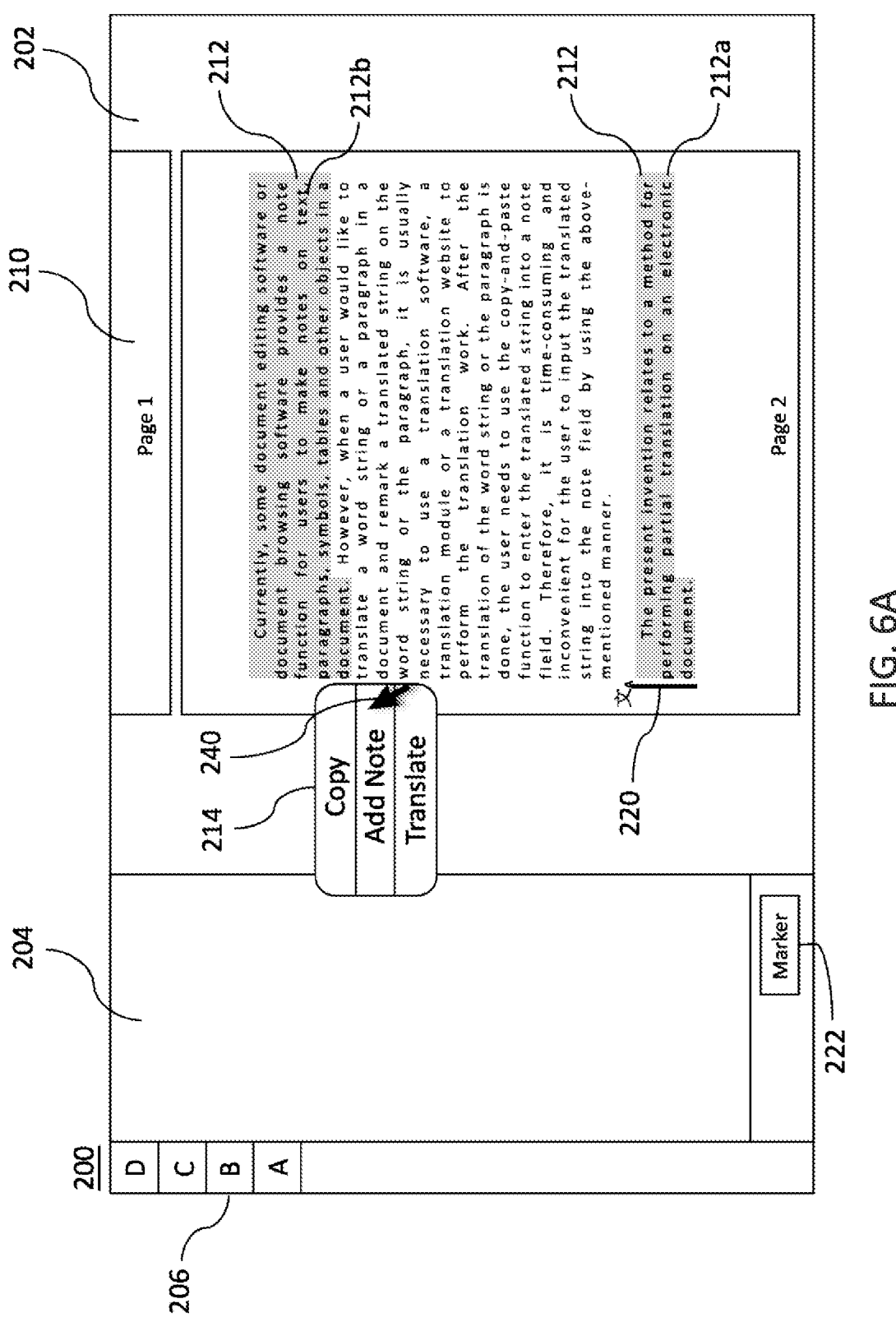
FIG. 6A to FIG. 6C are schematic diagrams of a user operation interface in different operation states according to another embodiment of the present disclosure.
Figure 6B:
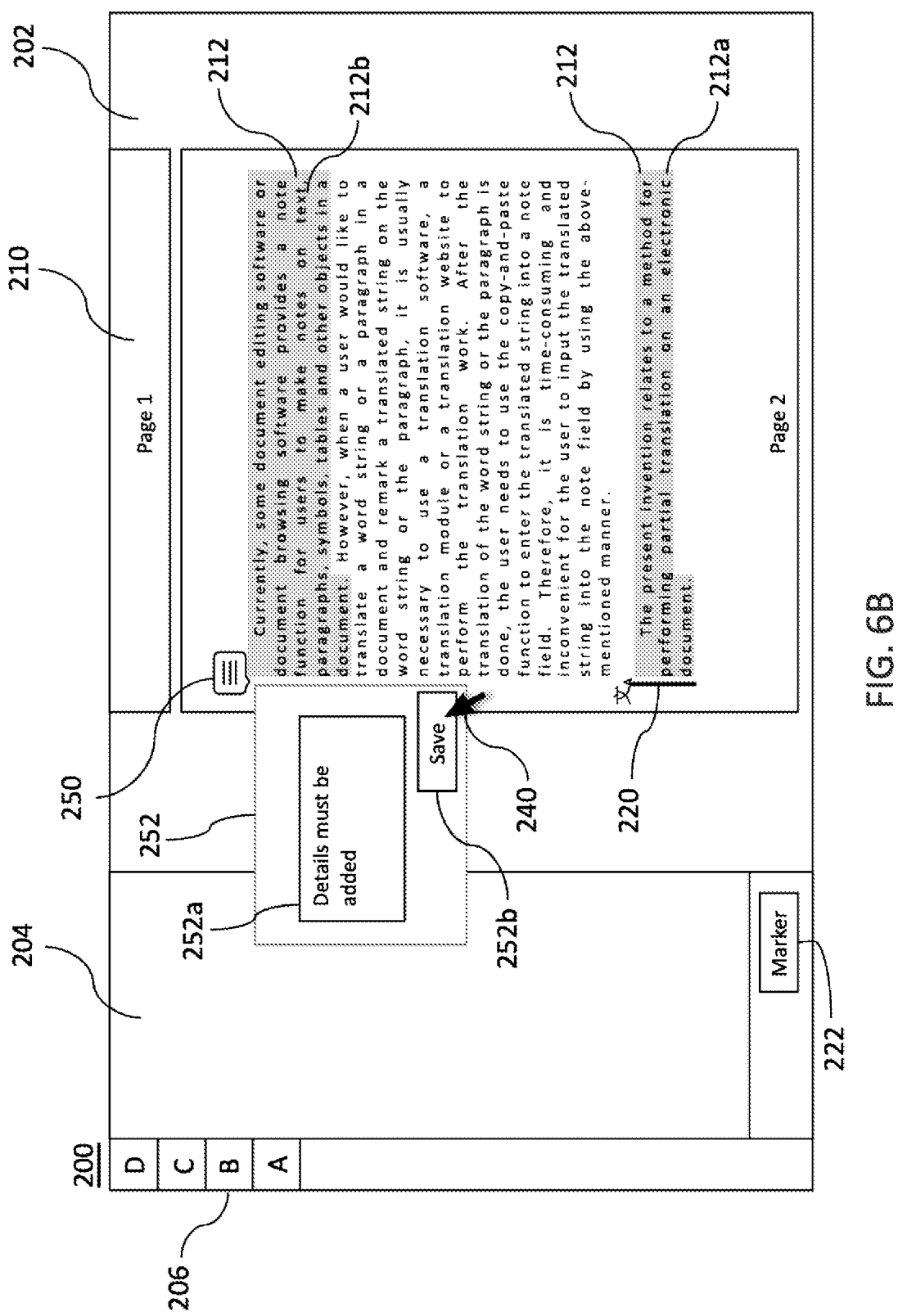
Figure 6C:
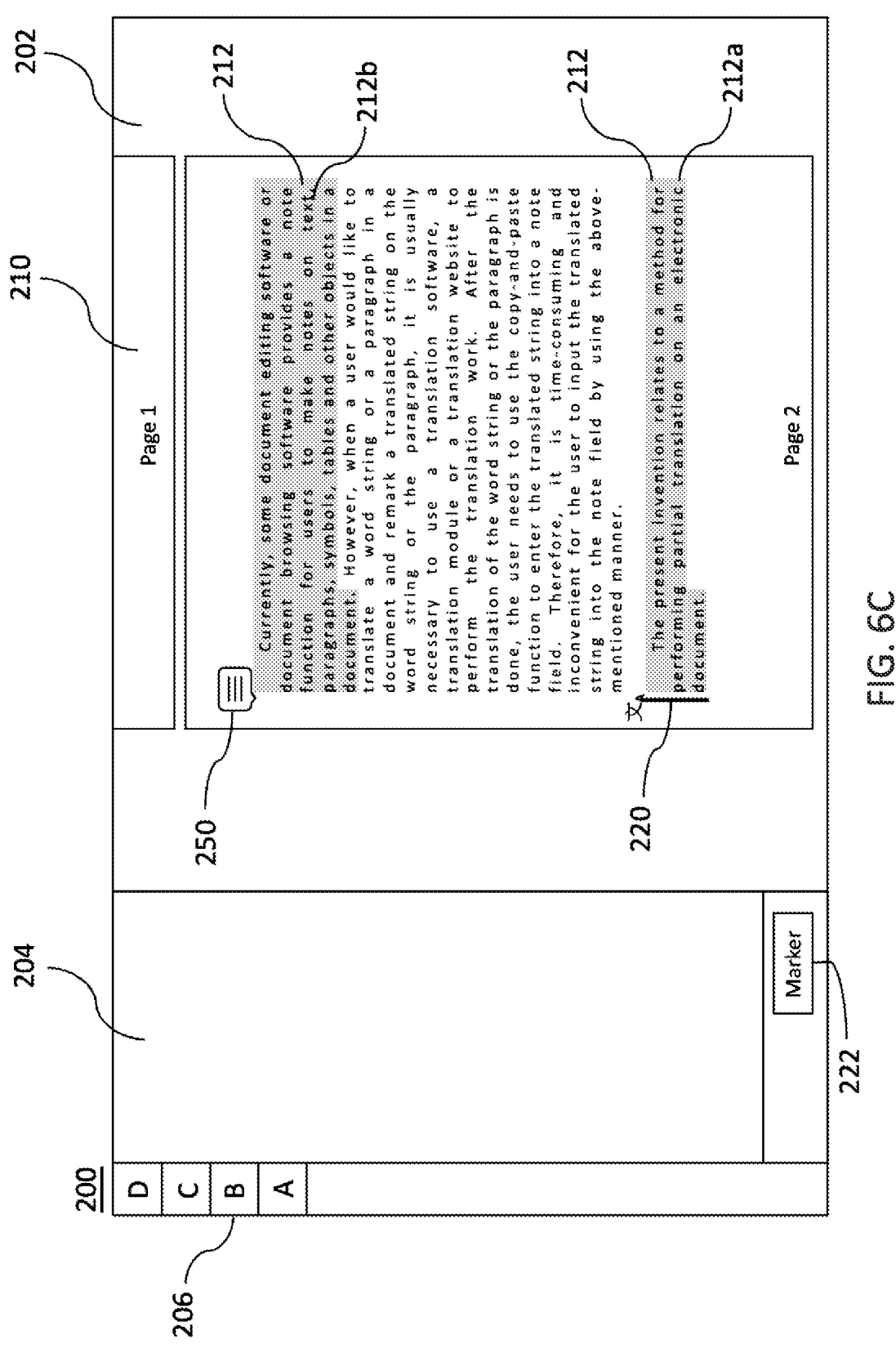

FIG. 6A to FIG. 6C are schematic diagrams of a user operation interface in different operation states according to another embodiment of the present disclosure. In the above embodiment, the method according to the present disclosure can further comprise the following step. The processor 102 can generate an annotation marker on the electronic document according to a third triggering event and make a translation marker (such as the first translation marker 220, the second translation marker 228, the third translation marker 229 or the fourth translation marker 230) displayed together with the annotation marker on the electronic document at the same time. For example, as shown in FIG. 6A, the processor 102 can select a text string 212b according to the steps S302 and S304 and drive the display 104 to display the function menu 214 on the user operation interface 200. In the present embodiment, the third triggering event may be a clicking selection of a cursor 240 controlled by the input element 108 (such as a mouse, a touch panel or a keyboard) on an "Add Note" option of the function option 214, but may not be limited thereto. After the "Add Note" option is clicked and selected by the cursor 240, the processor 102 can generate an annotation marker 250 associated with the text string 212b and an annotation window 252 and drive the display 104 to display the first translation marker 220, the annotation marker 250 and the annotation window 252 on the electronic document 210, as shown in FIG. 6B. In the present embodiment, the annotation window 252 has an annotation field 252a and a save button 252b. After the annotation field 252a receives a note text input by a user, and the save button 252b is clicked and selected by the cursor 240 controlled by the input device 108 (e.g., a mouse, a touch panel or a keyboard), the annotation window 252 can be hidden, as shown in FIG. 6C. In the present embodiment, after the annotation window 252 is hidden, the annotation marker 250 can be clicked and selected by the cursor 240 controlled by the input device 108 (e.g., a mouse, a touch panel or a keyboard) so as to make the annotation window 252 appear on the user interface 200 again.

In addition, in the present embodiment, the electronic document may be an electronic portable document format (PDF) document, and the first translation marker 220 and the annotation marker 250 are respectively implemented with two different PDF labels. For example, the annotation marker 250 can be implemented by a PDF standard label (e.g., Markup label), and the first translation marker 220 can be implemented by a PDF developer-defined label. Therefore, when the electronic document with the first translation marker 220 is opened by a document editing software or a document browsing software that supports the PDF developer-defined label, the first translation marker 220 can appear on the electronic document. On the contrary, when an electronic document with the first translation marker 220 is opened by a document editing software or a document browsing software that does not support the PDF developer-defined label, the first translation marker 220 will not appear on the electronic document. Alternatively, when an electronic document with the first translation marker 220 is opened by a document editing software or a document browsing software that does not support the PDF developer-defined label, the first translation marker 220 may be replaced by an annotation marker according to a different design.

It should be understood that, in all of the above embodiments, although the text string 212a of the electronic document 210 is translated from English to Chinese, the present disclosure is not limited thereto, that is, the method provided by the present disclosure can be applied to any translation between two languages in the electronic document.

Although the present disclosure has been disclosed by way of above embodiments, the embodiments are not intended to limit the present disclosure, and those skilled in the art will appreciate that changes and modifications may be made therein as long as those changes and modifications do not deviate from the spirit and the scope of the present disclosure. Therefore, the scope of the present disclosure should be construed according to the definitions in the appended claims.

What is claimed is:

1. A method for generating and applying a translation marker, the method being performed by a user apparatus comprising a processor and a display, and the method comprising:

executing, by the processor, a first software to generate a user operation interface and open an electronic document on the user operation interface, wherein the electronic document includes a first text string and a second text string;

displaying, by the display, the user operation interface, wherein the user operation interface comprises a document display area and an auxiliary display area, and the electronic document is opened on the document display area;

driving, by the processor, the display to display a third text string on the auxiliary display area;

selecting, by the processor, the first text string according to a first triggering event;

generating an annotation marker associated with the first text string on the electronic document according to a first triggering event;

driving, by the processor, the display to display the annotation marker on the electronic document;

selecting, by the processor, the second text string according to a second triggering event;

driving, by the processor, the display to display a translation option on the user operation interface;

detecting, by the processor, whether the translation option is selected; and when the translation option is detected to be selected, performing, by the processor, the following steps:

generating a code corresponding to the second text string by using an operation function;

determining whether a first translation record associated with the code exists in the user apparatus, wherein the first translation record includes a first translated text string corresponding to the second text string;

generating a first translation marker associated with the first translated text string on the electronic document when it is determined that the first translation record exists in the user apparatus;

driving, by the processor, the display to display the first translation marker on the electronic document simultaneously with the annotation marker; and driving the display to display the first translated text string on the auxiliary display area, when the first translation marker is selected, to replace the third text string displayed on the auxiliary display area, wherein when the processor executes a second software to open the electronic document with the annotation marker and the first translation marker, the first translation marker is replaced by another annotation marker, and wherein the electronic document is an electronic portable document format (PDF) document, and the first translation marker and the annotation marker are respectively implemented with two different PDF labels.

2. The method of claim 1, wherein when the translation option is detected to be selected, the method further comprises performing the following steps:

sending a translation request to a server to request the server to return a second translated text string corresponding to the second text string when it is determined that the first translation record does not exist in the user apparatus, wherein the translation request carries the code and the second text string;

receiving the second translated text string, which is in response to the translation request, from the server; and displaying the second translated text string on the user operation interface and generating a second translation marker associated with the second translated text string on the electronic document when the second translated text string is received from the server.

3. The method of claim 2, wherein the second translated text string is read from a storage of the server or is generated by the server calling a translation module to translate the second text string and transmitted to the user apparatus by the server.

4. The method of claim 2, further comprising:

storing the code and the second translated text string as a second translation record and storing the second translation record in the user apparatus.

5. The method of claim 2, further comprising:

encoding the translation request into a JSON (JavaScript Object Notation) object and sending the JSON object to the server.

6. The method of claim 1, wherein the operation function is a Hash function, and the code is a hash value.

7. The method of claim 1, wherein the step of generating the first translation marker associated with the first translated text string on the electronic document further comprises:

generating the first translation marker associated with the first translated text string on the electronic document according to a third triggering event.

8. A user apparatus for generating and applying a translation marker, comprising:

a processor;

a display electrically coupled to the processor; and a storage electrically coupled to the processor and configured to store at least one computer executable program, wherein the at least one computer executable program, when executed by the processor, causes the processor to perform the following steps:

executing a first software to generate a user operation interface and open an electronic document on the user operation interface, wherein the electronic document includes a first text string and a second text string;

driving the display to display the user operation interface, wherein the user operation interface comprises a document display area and an auxiliary display area, the electronic document is opened on the document display area;

driving the display to display a third text string on the auxiliary display area;

selecting the first text string according to a first triggering event;

generating an annotation marker associated with the first text string on the electronic document according to a first triggering event;

driving the display to display the annotation marker on the electronic document;

selecting the second text string according to a second triggering event;

driving the display to display a translation option on the user operation interface;

detecting whether the translation option is selected; and when the translation option is detected to be selected, performing the following steps:

generating a code corresponding to the second text string by using an operation function;

determining whether a first translation record associated with the code exists in the storage, wherein the first translation record includes a first translated text string corresponding to the second text string;

generating a first translation marker associated with the first translated text string on the electronic document when it is determined that the first translation record exists in the storage;

driving the display to display the first translation marker on the electronic document simultaneously with the annotation marker; and driving the display to display the first translated text string on the auxiliary display area, when the first translation marker is selected, to replace the third text string displayed on the auxiliary display area, wherein when the processor executes a second software to open the electronic document with the annotation marker and the first translation marker, the first translation marker is replaced by another annotation marker, and wherein the electronic document is an electronic portable document format (PDF) document, and the first translation marker and the annotation marker are respectively implemented with two different PDF labels.

9. The user apparatus of claim 8, further comprising:

an input device electrically coupled to the processor and configured to receive a first input and generate a first input signal corresponding to the first input, wherein the second triggering event is generated according to the first input signal.

10. The user apparatus of claim 8, further comprising:

a transmitter electrically coupled to the processor and configured to send a translation request to a server to request the server to return a second translated text string corresponding to the second text string when the processor determines that the first translation record does not exist in the storage, wherein the translation request carries the code and the second text string; and a receiver electrically coupled to the processor and con-
figured to receive the second translated text string,
which is in response to the translation request, from the
server;

wherein when the receiver receives the second translated
text string from the server, the processor is further
configured to display the second translated text string
on the user operation interface and generate a second
translation marker associated with the second trans-
lated text string on the electronic document.

11. The user apparatus of claim 10, wherein the processor
further performs:

storing the code and the second translated text string as a
second translation record and storing the second trans-
lation record in the storage.

12. The user apparatus of claim 10, wherein the processor
further performs:

encoding the translation request into a JSON (JavaScript
Object Notation) object and sending the JSON object to
the server through the transmitter.

13. The user apparatus of claim 8, wherein the step
performed by the processor to generate the first translation
marker associated with the first translated text string on the
electronic document further comprises:

generating the first translation marker associated with the
first translated text string on the electronic document
according to a third triggering event.

* * * * *